United States Patent [19]
Fowler

[11] Patent Number: 5,793,978
[45] Date of Patent: Aug. 11, 1998

[54] SYSTEM FOR ROUTING PACKETS BY SEPARATING PACKETS IN TO BROADCAST PACKETS AND NON-BROADCAST PACKETS AND ALLOCATING A SELECTED COMMUNICATION BANDWIDTH TO THE BROADCAST PACKETS

[75] Inventor: Gregory Alan Fowler, Mountain View, Calif.

[73] Assignee: Cisco Technology, Inc., San Jose, Calif.

[21] Appl. No.: 367,509

[22] Filed: Dec. 29, 1994

[51] Int. Cl.$^6$ .................................................. G06F 13/00
[52] U.S. Cl. ..................... 395/200.56; 395/200.31; 395/200.53; 395/200.65; 395/200.66
[58] Field of Search .................. 395/200.31, 200.56, 395/200.53, 200.65, 200.66; 358/400

[56] References Cited

U.S. PATENT DOCUMENTS

| Re. 33,900 | 4/1992 | Howson | 370/105 |
|---|---|---|---|
| 4,437,087 | 3/1984 | Petr | 340/347 DD |

(List continued on next page.)

FOREIGN PATENT DOCUMENTS

| 0 384 758 | 2/1990 | European Pat. Off. | H04L 12/56 |
|---|---|---|---|
| 0 431 751 | 2/1990 | European Pat. Off. | H04L 12/46 |
| 0 567 217 | 3/1993 | European Pat. Off. | H04L 12/46 |
| 9401828 | 1/1994 | WIPO | 15/40 |
| WO 95/20850 | 3/1995 | WIPO | H04L 12/56 |

OTHER PUBLICATIONS

Application Serial No. 08/081,646, "Message Header Classifier," William R. Crowther et al.
Pei, Tang–Bi & Zukowski, Charles, "Putting Routing Tables in Silicon," IEEE Network Magazine, Jan. 1992.
Tsuchiya, Paul., "A Search Algorithm for Table Entries with Non–contigous Wildcarding.".
Zhang, Hui et al., "Rate–Controlled Static–Priority Queueing", Infocom, pp. 227–236, 1993.
Chowdhury, Shyamal et al., Alternative Bandwidth Allocation Algorithms for Packet Video in ATM Networks, Infocom, pp. 1061–1068, 1992.
"Method and Apparatus for the Statistical Multiplexing of Voice, Data, and Image Signals", IBM TDB, Nov. 1992.
Allen, M. "Novell IPX Over Various WAN Media (IPX-WAN)", Network Working Group, RFC 1551, Dec. 1993, pp. 1–22.
Becker, D. "3c598.c: A 3c589 EtherLink3 ethernet driver for linux." becker@CESDIS.gsfc.nasa.gov, May 3 1994, pp. 1–13.
Doeringer, W., "Routing on Longest–Matching Prefixes," IEEE/ACM Transactions in Networking, vol. 4, No. 1, Feb. 1996, pp. 86–97.
Perkins, D. "Requirements for an Internet Standard Point-to–Point Protocol," Network Working Group, RFC 1547, Dec. 1993, pp. 1–19.
Simpson, W. "The Point–to–Point Protocol (PPP)", Network Working Group, RFC 1548, Dec. 1993, pp. 1–53.
Esaki, et al., "Datagram Delivery in an ATM–Internet," 2334b IEICE Transactions on Communications, Mar. 1994, No. 3, Tokyo, Japan.
Sarah E. Varney, "Crosscomm software includes Ethernet fault detection", Digital Review, v7, n33, 916(1), Aug. 27, 1990.

*Primary Examiner*—Thomas C. Lee
*Assistant Examiner*—Po C. Huang
*Attorney, Agent, or Firm*—The Law Offices of Steven A. Swernofsky

[57] ABSTRACT

A method and system for routing packets, in which the resources consumed by broadcast packets are limited. Broadcast packets are placed in a separate queue that is managed independently of the buffer interface queue for non-broadcast packets. The broadcast queue is limited to a selected amount of communication bandwidth; when the amount of broadcast traffic exceeds the selected bandwidth, broadcast messages are queued and held for transmission until later (i.e., when the selected amount of bandwidth becomes available). An operator may specify a maximum number of broadcast packets to be sent in any one second period, an a maximum number of broadcast packet bytes to be sent in any one second period.

17 Claims, 1 Drawing Sheet

U.S. PATENT DOCUMENTS

| | | | |
|---|---|---|---|
| 4,438,511 | 3/1984 | Baran | 370/19 |
| 4,446,555 | 5/1984 | Devault et al. | 370/94 |
| 4,506,358 | 3/1985 | Montgomery | 370/60 |
| 4,644,532 | 2/1987 | George | 370/94 |
| 4,646,287 | 2/1987 | Larson et al. | 370/60 |
| 4,677,423 | 6/1987 | Benvenuto et al. | 340/347 |
| 4,679,227 | 7/1987 | Hughes-Hartogs | 379/98 |
| 4,723,267 | 2/1988 | Jones et al. | 379/93 |
| 4,731,816 | 3/1988 | Hughes-Hartogs | 379/98 |
| 4,750,136 | 6/1988 | Aroin et al. | 364/514 |
| 4,757,495 | 7/1988 | Decker et al. | 370/76 |
| 4,769,810 | 9/1988 | Eckberg, Jr. et al. | 370/60 |
| 4,769,811 | 9/1988 | Eckberg, Jr. et al. | 370/60 |
| 4,771,425 | 9/1988 | Baran et al. | 370/85 |
| 4,819,228 | 4/1989 | Baran et al. | 370/85 |
| 4,833,706 | 5/1989 | Hughes-Hartogs | 379/98 |
| 4,835,737 | 5/1989 | Herrig et al. | 364/900 |
| 4,870,571 | 9/1989 | Frink | 395/200 |
| 4,879,551 | 11/1989 | Georgiou et al. | 340/825.87 |
| 4,903,261 | 2/1990 | Baran et al. | 370/94.2 |
| 4,922,486 | 5/1990 | Lidinsky et al. | 370/60 |
| 4,933,937 | 6/1990 | Konishi | 370/85.13 |
| 4,960,310 | 10/1990 | Cushing | 350/1.7 |
| 4,962,497 | 10/1990 | Ference et al. | 370/60.1 |
| 4,962,532 | 10/1990 | Kasiraj et al. | 380/25 |
| 4,970,678 | 11/1990 | Sladowski et al. | 380/25 |
| 4,980,897 | 12/1990 | Decker et al. | 375/38 |
| 4,991,169 | 2/1991 | Davis et al. | 370/77 |
| 4,996,685 | 2/1991 | Farese et al. | 370/58.1 |
| 5,014,265 | 5/1991 | Hahne et al. | 370/60 |
| 5,020,058 | 5/1991 | Holden et al. | 370/109 |
| 5,054,034 | 10/1991 | Hughes-Hartogs | 375/8 |
| 5,059,925 | 10/1991 | Weisbloom | 331/1 A |
| 5,072,449 | 12/1991 | Enns et al. | 371/37.1 |
| 5,088,032 | 2/1992 | Bosack | 395/200 |
| 5,115,431 | 5/1992 | Williams et al. | 370/94.1 |
| 5,128,945 | 7/1992 | Enns et al. | 371/37.1 |
| 5,136,580 | 8/1992 | Videlock et al. | 370/6 C |
| 5,166,930 | 11/1992 | Braff et al. | 370/94.1 |
| 5,206,886 | 4/1993 | Bingham | 375/97 |
| 5,212,686 | 5/1993 | Joy et al. | 370/60 |
| 5,224,099 | 6/1993 | Corbalis et al. | 370/94.2 |
| 5,228,062 | 7/1993 | Bingham | 375/97 |
| 5,229,994 | 7/1993 | Balzano et al. | 370/85.13 |
| 5,231,633 | 7/1993 | Hluchyj et al. | 370/94.1 |
| 5,237,564 | 8/1993 | Lespagnol et al. | 370/60.1 |
| 5,241,682 | 8/1993 | Bryant et al. | 395/800 |
| 5,243,342 | 9/1993 | Kattemalalavadi et al. | 341/106 |
| 5,243,596 | 9/1993 | Port et al. | 370/94.1 |
| 5,247,516 | 9/1993 | Bernstein et al. | 370/82 |
| 5,249,178 | 9/1993 | Kurano et al. | 370/60 |
| 5,255,291 | 10/1993 | Holden et al. | 375/111 |
| 5,260,933 | 11/1993 | Rouse | 370/14 |
| 5,268,592 | 12/1993 | Bellamy et al. | 307/43 |
| 5,268,900 | 12/1993 | Hluchyj et al. | 370/94.1 |
| 5,271,004 | 12/1993 | Proctor et al. | 370/60 |
| 5,274,631 | 12/1993 | Bhardwaj | 370/60 |
| 5,274,635 | 12/1993 | Rahman et al. | 370/60.1 |
| 5,274,643 | 12/1993 | Fisk | 370/94.1 |
| 5,280,470 | 1/1994 | Buhrke et al. | 370/13 |
| 5,280,480 | 1/1994 | Pitt et al. | 370/85.13 |
| 5,280,500 | 1/1994 | Mazzola et al. | 375/17 |
| 5,287,103 | 2/1994 | Kasprzyk et al. | 340/825.52 |
| 5,291,482 | 3/1994 | McHarg et al. | 370/60 |
| 5,305,311 | 4/1994 | Lyles | 370/60 |
| 5,307,343 | 4/1994 | Bostica et al. | 370/60 |
| 5,311,509 | 5/1994 | Heddes et al. | 370/60 |
| 5,313,454 | 5/1994 | Bustini et al. | 370/13 |
| 5,313,582 | 5/1994 | Hendel et al. | 395/250 |
| 5,317,562 | 5/1994 | Nardin et al. | 370/16 |
| 5,327,421 | 7/1994 | Hiller et al. | 370/60.1 |
| 5,331,637 | 7/1994 | Francis et al. | 370/54 |
| 5,345,445 | 9/1994 | Hiller et al. | 370/60.1 |
| 5,345,446 | 9/1994 | Hiller et al. | 370/60.1 |
| 5,359,592 | 10/1994 | Corbalis et al. | 370/17 |
| 5,361,256 | 11/1994 | Doeringer et al. | 370/60 |
| 5,361,259 | 11/1994 | Hunt et al. | 370/84 |
| 5,365,524 | 11/1994 | Hiller et al. | 370/94.2 |
| 5,367,517 | 11/1994 | Cidon et al. | 370/54 |
| 5,371,852 | 12/1994 | Attanasio et al. | 395/200 |
| 5,381,413 | 1/1995 | Tobagi et al. | 370/85.6 |
| 5,386,567 | 1/1995 | Lien et al. | 395/700 |
| 5,390,175 | 2/1995 | Hiller et al. | 370/60 |
| 5,394,394 | 2/1995 | Crowther et al. | 370/60 |
| 5,394,402 | 2/1995 | Ross | 370/94.1 |
| 5,416,842 | 5/1995 | Aziz | 380/30 |
| 5,422,880 | 6/1995 | Heitkamp et al. | 370/60 |
| 5,422,882 | 6/1995 | Hiller et al. | 370/60.1 |
| 5,423,002 | 6/1995 | Hart | 395/200 |
| 5,426,636 | 6/1995 | Hiller et al. | 370/60.1 |
| 5,428,607 | 6/1995 | Hiller et al. | 370/60.1 |
| 5,430,715 | 7/1995 | Corbalis et al. | 370/54 |
| 5,442,457 | 8/1995 | Najafi | 358/400 |
| 5,442,630 | 8/1995 | Gagliardi et al. | 370/85.13 |
| 5,446,735 | 8/1995 | Tobagi et al. | 370/85.3 |
| 5,452,297 | 9/1995 | Hiller et al. | 370/60.1 |
| 5,473,599 | 12/1995 | Li et al. | 370/16 |
| 5,473,607 | 12/1995 | Hausman et al. | 370/85.13 |
| 5,491,687 | 2/1996 | Christensen et al. | 370/17 |
| 5,491,804 | 2/1996 | Heath et al. | 395/275 |
| 5,509,006 | 4/1996 | Wilford et al. | 370/60 |
| 5,519,704 | 5/1996 | Farinacci et al. | 370/85.13 |
| 5,526,489 | 6/1996 | Nilakantan et al. | 395/200.02 |
| 5,530,963 | 6/1996 | Moore et al. | 395/200.15 |
| 5,535,195 | 7/1996 | Lee | 370/54 |
| 5,561,669 | 10/1996 | Lenney et al. | 370/60.1 |
| 5,583,862 | 12/1996 | Callon | 370/397 |
| 5,592,470 | 1/1997 | Rudrapatna et al. | 370/320 |
| 5,598,581 | 1/1997 | Daines et al. | 395/872 |
| 5,617,417 | 4/1997 | Sathe et al. | 370/394 |
| 5,617,421 | 4/1997 | Chin et al. | 370/402 |
| 5,632,021 | 5/1997 | Jennings et al. | 395/309 |

SYSTEM FOR ROUTING PACKETS BY SEPARATING PACKETS IN TO BROADCAST PACKETS AND NON-BROADCAST PACKETS AND ALLOCATING A SELECTED COMMUNICATION BANDWIDTH TO THE BROADCAST PACKETS

BACKGROUND OF THE INVENTION

1. Field of the Invention

This invention relates to broadcast queuing in a computer network.

2. Description of Related Art

In routing messages in a computer network or a network of networks (an "internetwork"), protocols for routing message packets generally require periodic updates of routing information. Routing updates and similar packets transmitted by a node must generally be broadcast to a large number of recipients. In networks where many recipients are coupled to the same transmission medium, this is not generally a problem, because the packet may be marked as a "broadcast" packet, whereby each node coupled to that medium will attempt to receive and process it.

In frame relay networks (in which each output connection from a node has only a single recipient), broadcast packets must instead be replicated and transmitted individually to each recipient. When a large number of replicated packets are sent, transmitting those replicated packets, may occupy a significant amount of processor time and communication bandwidth available to the node. This "broadcast storm" can have an adverse effect on other packet traffic being routed by that node, and packet traffic being routed by the recipients of the packets being broadcast by the node. The replicated packets can cause noticeable delay in network traffic and reduce available buffer capacity in the network.

Accordingly, it would be advantageous to provide an improved method and system for routing packets, in which the resources consumed by broadcast packets are limited.

SUMMARY OF THE INVENTION

The invention provides a method and system for routing packets, in which the resources consumed by broadcast packets are limited. Broadcast packets are placed in a separate broadcast queue that is managed independently of the buffer interface queue for non-broadcast packets. The separate broadcast queue is limited to a selected amount of communication bandwidth; when the amount of broadcast traffic exceeds the selected bandwidth, broadcast messages are queued and held for transmission until later (i.e., when the selected amount of bandwidth becomes available).

In a preferred embodiment, an operator may specify a maximum number of broadcast packets to be sent in any one second period, and a maximum number of broadcast packet bytes to be sent in any one second period.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require invention or undue experimentation.

GENERAL FEATURES OF THE METHOD AND SYSTEM

Figure 1:
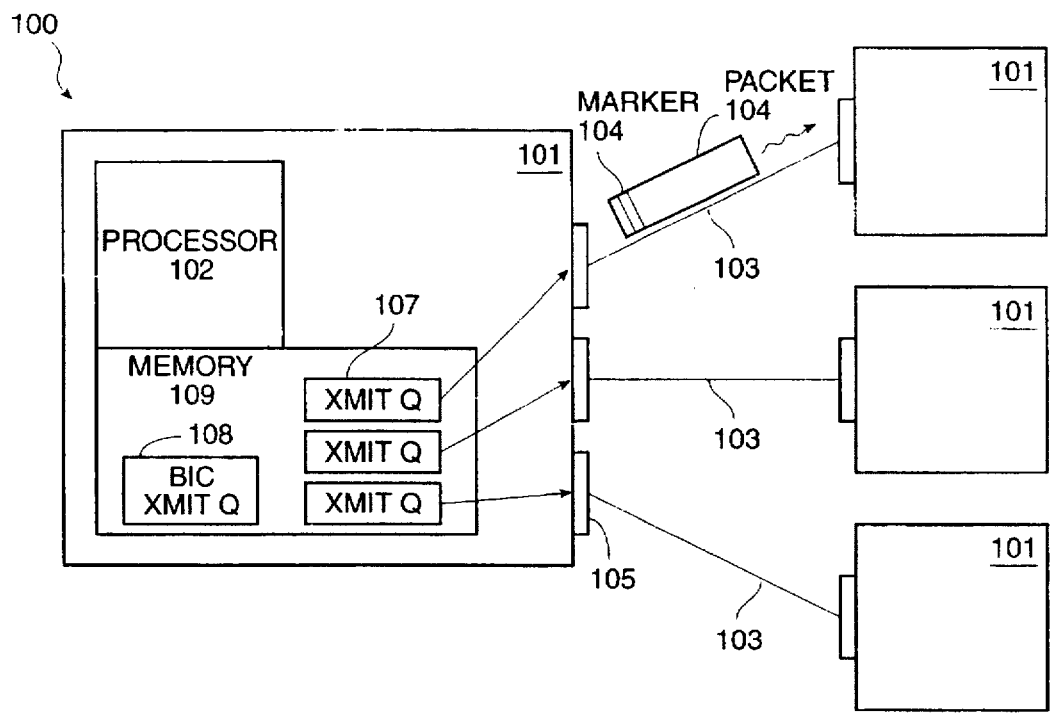
FIG. 1 shows a block diagram of a part of a frame relay network.

FIG. 1 shows a block diagram of a part of a frame relay network.

A frame relay network 100 comprises a set of nodes 101. Each node 101 comprises a processor 102, a set of communication links 103 for transmitting packets 104, and one network interface 105 for each communication link 103, coupled to the processor 102 and to the communication link 103.

Although each communication link 103 is shown separately, in practice, each communication link 103 comprises a virtual communication link 103 implemented as a virtual circuit on a switching network. Also, although one access port is shown for each communication link, in practice, there is a single access port and the switching network transports packets to their destination responsive to a destination address in the packet header.

Although the invention is disclosed with regard to a frame relay network, those skilled in the art would recognize, after perusal of this application, that the invention is also applicable to other types of network, including those networks where a single physical interface connects to more than one node and no broadcast mechanism is provided by the medium, and that application of the invention to such other types of networks would not require invention or undue experimentation.

The processor 102 comprises a memory 109 in which packets 104 are stored. Each packet 104 comprises a marker bit 106 to indicate whether the packet 104 is for broadcast or not. The marker bit 106 is set when the broadcast packet 104 is first created.

The memory 109 comprises a transmit queue 107 for each network interface 105. Although the processor 102 may maintain only a single transmit queue 107 for each network interface 105, it may also maintain a plurality of transmit queues 107 for each network interface 105, differentiated by priority or other criteria.

The memory 109 further comprises a special transmit queue 108 just for broadcast packets 104. Similar to the transmit queues 107 associated with each network interface 105, the processor 102 may maintain only a single special transmit queue 108 for broadcast packets 104, or it may also maintain a plurality of special transmit queues 108 just for broadcast packets 104, differentiated by priority or other criteria.

When a node 101 attempts to send a non-broadcast packet 104, it simply queues the packet 104 for transmission on a transmit queue 107 associated with its destination network interface 105. In a preferred embodiment, the transmit queue 107 is limited to a selected maximum length or size.

In contrast, when a node 101 attempts to send a broadcast packet 104, it replicates the packet 104 once for each network interface 105, and queues each replicated packet 104 for transmission on the special transmit queue 108 just for broadcast packets 104. In a preferred embodiment, the special transmit queue 108 is limited to a selected length or size, which may differ from the selected maximum length or size for the non-broadcast transmit queue 107.

METHOD OF BROADCAST QUEUING

Figure 2:
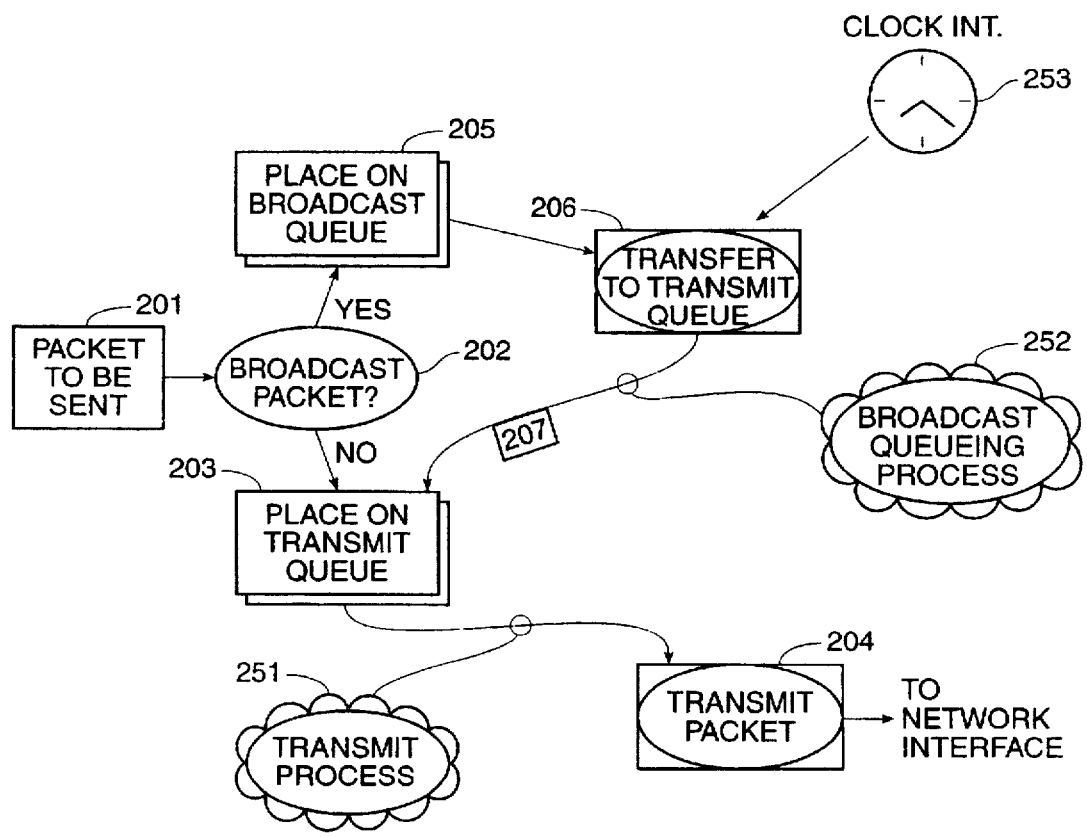
FIG. 2 shows a flow diagram of a method of broadcast packet queuing, and data structures used therewith.

FIG. 2 shows a flow diagram of a method of broadcast packet queuing, and data structures used therewith.

At a flow point 201, the processor 102 has identified a packet 104 to be sent.

At a step 202, the processor 102 determines if the packet 104 to be sent is for broadcast or not for broadcast. If the packet 104 is for broadcast, the processor 102 continues with the step 205. Otherwise, the processor 102 continues with the step 203.

At a step 203, the processor 102 queues the packet 104 to be sent on a transmit queue 107 associated with its destination network interface 105, and the processor 102 continues with the step 204.

At a step 204, a transmit process 251 (an independent processing thread operating on the processor 102) reads packets 104 from the transmit queue 107 and transmits them in turn to the associated network interface 105.

At a step 205, the processor 102 replicates the broadcast packet 104 and places it on the special transmit queue 108.

At a step 206, a broadcast queuing process 252 (another independent processing thread operating on the processor 102) is triggered by a clock 253, such as using a clock interrupt, and reads packets 104 from the special transmit queue 108.

At a step 207, the broadcast queuing process 252 places broadcast packets 104 on the transmit queue 107 associated with its destination network interface 105. The broadcast queuing process 252 restricts the number of broadcast packets 104 queued on the transmit queue 107 to the selected limit. If either limit is reached (either the selected maximum number of broadcast packets per second or the selected maximum number of broadcast packet bytes per second), broadcast packets 104 are no longer queued to on the transmit queue 107.

In a preferred embodiment, the processor 102 receives instructions from an operator, who may designate the following values:

a selected maximum number of broadcast packets 104 in the special transmit queue 108;

a selected maximum number of broadcast packets 104 per second; and a selected maximum number of broadcast packet bytes per second.

The selected values are stored in the memory 105 and are used to control the clock 253 and the clock interrupt.

In a preferred embodiment, the selected maximum number of broadcast packets 104 in the special transmit queue 108 is set to a default of 64 broadcast packets 104, the selected maximum number of broadcast packets 104 per second is set to a default of 36 broadcast packets 104, the selected maximum number of broadcast packet bytes per second is set to a default of 256,000 bytes. These default values may be altered responsive to characteristics of the network. For example, the maximum number of broadcast packet bytes per second should be set to be less than approximately the lesser of one quarter of the a minimum remote access rate (the remote nodes' rate of access to the communication link 103) and one quarter of a local access rate (the local node's rate access to the communication link 103), the maximum number of broadcast packets 104 per second should be set to approximately 1/250 of the maximum number of broadcast packet bytes per second, and the maximum number of broadcast packets 104 in the special transmit queue 108 should be set to approximately 20 times the number of remote nodes 101.

Alternative Embodiments

Although preferred embodiments are disclosed herein, many variations are possible which remain within the concept, scope, and spirit of the invention, and these variations would become clear to those skilled in the art after perusal of this application.

I claim:

1. A system for routing packets, comprising:

a network interface;

a first transmit queue associated with said network interface;

a second transmit queue for queuing broadcast packets to said first transmit queue;

means for identifying a packet as a broadcast packet or a non-broadcast packet;

means, responsive to said means for identifying, for placing said packets identified as non-broadcast packets in said first transmit queue and for placing said packets identified as broadcast packets in said second transmit queue;

means for allocating a selected communication bandwidth to said broadcast packets; and means for transferring packets from said second transmit queue to said first transmit queue responsive to said means for allocating, wherein resources occupied by said broadcast packets are limited to said selected communication bandwidth.

2. A system as in claim 1, wherein said means for placing is responsive to a clock.

3. A system as in claim 1, comprising means for receiving an operator command; and means for setting a length of said second transmit queue responsive to said operator command.

4. A system as in claim 1, wherein said means for transferring is responsive to a clock.

5. A system as in claim 1, wherein said means for transferring comprises means for limiting said broadcast packets to a selected number of bytes per second.

6. A system as in claim 1, wherein said means for transferring comprises means for limiting said broadcast packets to a selected number of packets per second.

7. A system as in claim 1, wherein said means for allocating communication bandwidth operates to limit said broadcast packets to a selected total amount of communication bandwidth for said network.

8. A system as in claim 1, further comprising means for receiving a designation of communication bandwidth to be allocated to broadcast packets; wherein said means for allocating communication bandwidth is responsive to said means for receiving.

9. A system as in claim 8, further comprising means for receiving an operator command, wherein said means for allocating communication bandwidth is responsive to said operator command.

10. A method for routing packets, comprising the steps of identifying a packet as a broadcast packet or a non-broadcast packet;

placing said packet on a first transmit queue associated with a network interface, or on a second transmit queue for queuing broadcast packets to said first transmit queue, responsive to said step of identifying;

reading packets from said first transmit queue and transmitting said packets to said network interface;

allocating a selected communication bandwidth to said broadcast packets; and reading packets from said second transmit queue and transferring said packets from said second transmit queue to said first transmit queue, said first transmit queue responding to said selected communication bandwidth; and limiting resources occupied by said broadcast packets to said selected communication bandwidth.

11. A method as in claim 10, further comprising the steps of setting a clock interrupt; and triggering said clock interrupt responsive to a clock;

wherein said step of transferring packets from said second transmit queue to said first transmit queue is responsive to said clock interrupt.

12. A method as in claim 10, further comprising the steps of receiving an operator command; and setting a length of said second transmit queue responsive to said operator command.

13. A method as in claim 10, wherein said step of transferring from said second transmit queue to said first transmit queue comprises the step of limiting said broadcast packets to a selected number of bytes per second.

14. A method as in claim 10, wherein said step of transferring from said second transmit queue to said first transmit queue comprises the step of limiting said broadcast packets to a selected number of packets per second.

15. A system, as in claim 10, wherein said step of allocating operates to limit said broadcast packets to a selected total amount of communication bandwidth for said network.

16. A system, as in claim 10, further comprising the step of receiving a designation of communication bandwidth to be allocated to broadcast packets; wherein said means for allocating communication bandwidth is responsive to said means for receiving.

17. A system, as in claim 16, further comprising the step of receiving an operator command, wherein said means for allocating communication bandwidth is responsive to said operator command.

* * * * *